United States Patent Office 2,977,383
Patented Mar. 28, 1961

2,977,383

HALOGENATED TETRAALKYL PYROPHOSPHATES

Werner Perkow, Hamburg, Germany, assignor to C. F. Spiess & Sohn, Kleinkarlbach, Germany, and Norddeutsche Affinerie, Hamburg, Germany No Drawing. Filed July 27, 1959, Ser. No. 829,553

2 Claims. (Cl. 260—461)

The present invention relates to novel halogenated tetraalkyl pyrophosphates having strong insecticidal activity.

The novel compounds according to the invention are of the following general formula:

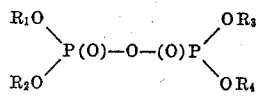

in which $R_1$, $R_2$, $R_3$ and $R_4$ signify alkyl radicals containing 1 to 4 carbon atoms, at least one of such alkyl radicals containing one or more halogen atoms as substituents.

Such halogenated tetraalkyl pyrophosphates can be prepared by reacting trialkyl phosphates, $(RO)_3PO$, with elemental chlorine or bromine in the presence of actinic light rays.

The reaction proceeds with the liberation of alkyl halide and hydrogen halide. The reaction is expediently carried out in an inert organic solvent, such as trichloromethane or tetrachloromethane. The temperature employed depends upon the reactivity of the starting material, the type of solvent and the quantity of halogen to be introduced. A mercury vapor lamp can, for example, serve as the source of the actinic light. In addition, discharge lamps of the type of neon-tubes have been found particularly suited, the mild light of which still contains a considerable amount of ultraviolet rays.

Without supplemental irradiation it has not been possible, for example, to produce chlorine containing tetraalkyl pyrophosphates by the action of chlorine on trialkyl phosphates. It is furthermore not possible to introduce chlorine atoms or other substituents in tetraalkyl pyrophosphates as the bond of the bridging oxygen between both phosphate radicals is easily split when subjected to aggressive conditions. According to the process of the invention, however, the halogen containing pyrophosphate is immediately obtained in the first reaction step. Such halogen containing pyrophosphate is of sufficient stability that it can be halogenated further in the presence of actinic rays.

The insecticidal properties of the new compounds according to the invention can also be changed according to requirements by varying the halogen content thereof. For example, trimethyl-chloromethyl-pyrophosphate produced by reacting chlorine with trimethyl phosphate while irradiating the reaction mixture is an insecticide having a strong systemic action. It is easily taken up by plants and transported therein by the sap stream. As a consequence it reaches the locations of all hidden sucking insects which cannot be reached by direct spraying. The chlorine free tetramethyl phosphate $$(CH_3O)_2—P(O)—O—(O)P—(OCH_3)_2$$

on the other hand, does not possess systemic properties. The products according to the invention containing 2 or 3 or more chlorine atoms obtained after longer action of chlorine at higher temperatures also possess systemic properties, but these decrease with increasing chlorine content. On the other hand, their action as contact insecticides increases with increasing chlorine content.

The novel compounds according to the invention can be employed as insecticides in conjunction with normal insecticide adjuvants, such as, emulsifiers, wetting agents, solvents, fillers and can be used in the form of solutions, emulsions, dusting powders and wettable powders.

The following examples will serve to illustrate a number of embodiments of the invention.

Example 1

70 g. of phosphoric acid trimethyl ester $(CH_3)_3PO$ were diluted with 250 cc. of dry chloroform and such solution was placed in a chlorinating tube, the interior of which was irradiated by a mercury vapor lamp. A lively stream of chlorine was introduced into such solution while it was irradiated by the mercury vapor lamp. During the introduction of the stream of chlorine the solution heated up to its boiling point. After about 30–40 minutes, a sample withdrawn from the reaction solution, after removal of the solvent under vacuum had a chlorine content of 13–14%. The liquid colorless reaction product for the greatest part consisted of trimethylchloromethyl pyrophosphate of the formula $$(CH_3O)_2—P(O)—O—(O)P—(OCH_3)(OCH_2Cl)$$

which distills at 1.5 mm. Hg at 87–89° C.

50 parts by weight of the chlorinated pyrophosphate ester thus obtained were mixed with 25 parts by weight of a non-ionic emulsifier, for example, a lauryl polyglycol ether produced from 7 mols of ethylene oxide and 1 mol of lauryl alcohol and 25 parts by weight of monochlorobenzene. This mixture was easily emulsified in water. Aqueous 0.1% emulsions thereof upon sraying plants therewith gave 100% control of all types of red spider mites. The chlorinated pyrophosphate not only killed the spider mites by direct contact but also was absorbed by the leaves and roots of the plants and remained effective for about 1 week in the plant sap.

Example 2

The chlorination procedure of Example 1 was repeated but continued until a test of a sample of the reaction product indicated that it contained about 23% of chlorine. The gas evolved during such continued chlorination primarily was HCl and it only contained a small proportion of methyl chloride. The phosphorus content of the thin liquid chlorinated compound produced was 21%. It could not be distilled without decomposition.

2 g. of this compound were uniformily triturated with 98 g. of talcum. A coating of this dust in Petri dishes corresponding to an application of about 4 kg. per acre (10 kg. per hektare) produced a 100% kill of Calandra granaria in a few hours.

Example 3

A chlorinated reaction solution was produced as in Example 1 and thereafter 80 g. of bromine were dropped in, while continuing the irradiation of the reaction solution, so slowly that the solution continuously decolorized with evolution of HBr. Upon completion of the reaction and distilling off the solvent a yellow, nondistillable oil was obtained, the analysis of which indicated that it had the formula $C_4H_{10}O_7P_2ClBr$.

A 0.01% solution of this compound in acetone was prepared and a filter paper 8.5 cm. in diameter was impregnated with 2 cc. of the solution. After evaporation of the solvent the filter paper was placed in a Petri dish containing house flies (*Musca domestica*). A 100% kill was attained in several minutes.

I claim:
1. Trimethyl-chloromethyl-pyrophosphate.
2. Trimethyl-dichloromethyl-pyrophosphate.

References Cited in the file of this patent

UNITED STATES PATENTS

| | | |
|---|---|---|
| 2,554,757 | Smith et al. | May 29, 1951 |
| 2,787,629 | Coover et al. | Apr. 2, 1957 |